United States Patent
Kim et al.

(10) Patent No.: US 12,199,265 B2
(45) Date of Patent: Jan. 14, 2025

(54) METHOD AND APPARATUS FOR PREPARING DRY ELECTRODE SHEET FOR SECONDARY BATTERY, DRY ELECTRODE SHEET FOR SECONDARY BATTERY, ELECTRODE FOR SECONDARY BATTERY AND SECONDARY BATTERY

(71) Applicant: SK On Co., Ltd., Seoul (KR)

(72) Inventors: Jae Youn Kim, Daejeon (KR); Yong Hee Kang, Daejeon (KR); Young Jun Kim, Daejeon (KR); Dong Hoon Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/321,222

(22) Filed: May 22, 2023

(65) Prior Publication Data
US 2023/0378422 A1  Nov. 23, 2023

(30) Foreign Application Priority Data
May 23, 2022  (KR) .......................... 10-2022-0062784

(51) Int. Cl.
*H01M 4/04* (2006.01)
*H01M 4/38* (2006.01)
(Continued)

(52) U.S. Cl.
CPC .......... *H01M 4/0435* (2013.01); *H01M 4/38* (2013.01); *H01M 4/623* (2013.01); *H01M 10/0404* (2013.01)

(58) Field of Classification Search
None
See application file for complete search history.

(56) References Cited

U.S. PATENT DOCUMENTS 9,525,168 B2 * 12/2016 Mitchell ............. H01M 4/0409
2019/0237748 A1  8/2019 Shin et al.
(Continued)

FOREIGN PATENT DOCUMENTS

CN  111200106 A  5/2020
CN  112864346 A  5/2021
(Continued)

OTHER PUBLICATIONS

Extended European Search Report for the European Patent Application No. 23174745.2 issued by the European Patent Office on Oct. 17, 2023.

*Primary Examiner* — Tracy M Dove
(74) *Attorney, Agent, or Firm* — IP & T GROUP LLP (57) ABSTRACT

A method of manufacturing a dry electrode sheet for a secondary battery includes providing a dry electrode composition comprising an electrode active material and a binder, a calendering operation of preparing an electrode sheet by passing the dry electrode composition through a calender roll including three or more rolls. The calendering operation includes a first electrode sheet manufacturing operation of manufacturing a first electrode sheet by injecting the dry electrode composition between two adjacent rolls spaced apart from each other by a first interval W1, and an electrode sheet manufacturing operation of manufacturing a dry electrode sheet by inserting the first electrode sheet between two adjacent rolls spaced apart from each other by a second interval W2. The first interval W1 and the second interval W2 have a compression rate of 0.10 or more and 0.65 or less, represented by the equation (1) compression rate=(W1−W2)/W1.

10 Claims, 3 Drawing Sheets

(51) Int. Cl.
*H01M 4/62* (2006.01)
*H01M 10/04* (2006.01)

(56) References Cited

U.S. PATENT DOCUMENTS

| | | |
|---|---|---|
| 2020/0016171 A1 | 5/2020 | Hayashi et al. |
| 2020/0161711 A1* | 5/2020 | Hayashi .............. H01M 4/0409 |
| 2021/0155766 A1 | 5/2021 | Zhang et al. |
| 2021/0249657 A1 | 8/2021 | Shin et al. |
| 2022/0173371 A1 | 6/2022 | Fukunaga et al. |

FOREIGN PATENT DOCUMENTS

| | | |
|---|---|---|
| CN | 114365304 A | 4/2022 |
| EP | 3680961 A1 | 7/2020 |
| KR | 10-2020-0090744 A | 7/2020 |
| KR | 10-2020-0136039 A | 12/2020 |
| KR | 10-2021-0005566 A | 1/2021 |

* cited by examiner

METHOD AND APPARATUS FOR PREPARING DRY ELECTRODE SHEET FOR SECONDARY BATTERY, DRY ELECTRODE SHEET FOR SECONDARY BATTERY, ELECTRODE FOR SECONDARY BATTERY AND SECONDARY BATTERY

CROSS-REFERENCE TO RELATED APPLICATION(S)

This application claims benefit of priority to Korean Patent Application No. 10-2022-0062784 filed on May 23, 2022 in the Korean Intellectual Property Office, the disclosure of which is incorporated herein by reference in its entirety.

BACKGROUND

1. Field

The present disclosure relates to a method and apparatus for manufacturing a dry electrode sheet for a secondary battery, a dry electrode sheet for a secondary battery, an electrode for a secondary battery, and a secondary battery.

2. Description of Related Art

Lithium secondary batteries are used not only as an energy source for mobile devices, but also as a power source for electric vehicles (EVs) and hybrid electric vehicles (HEVs), and demand therefor is also continuously increasing. The manufacturing process of a lithium secondary battery is divided into three stages, an electrode process for manufacturing electrodes, an assembly process for manufacturing an electrode assembly, and a chemical process that activates the battery. The electrode process is re-divided into a mixing process of mixing an electrode mixture containing an electrode active material, a coating process of coating the electrode mixture on a current collector to form an electrode mixture layer, a drying operation of removing the solvent in the electrode mixture layer, a rolling process of forming an electrode mixture layer to have a desired thickness, and a slitting process to cut the electrode into a predetermined shape.

Generally, in the electrode mixture layer, an electrode mixture slurry is prepared by dispersing an electrode mixture including an electrode active material and a binder in a solvent such as water or NMP, and after applying the electrode mixture slurry to the current collector, it is dried to evaporate the solvent contained in the electrode mixture layer. However, in the process of evaporating the solvent, pinholes or cracks may be formed in the electrode mixture layer, resulting in defective electrode surfaces.

On the other hand, in the drying process, the inside and outside of the electrode mixture layer are not uniformly dried. Due to the difference in the evaporation rate of the solvent, a particle floating phenomenon occurs in which the particles of the area dried first rise to the surface of the electrode. There is a problem of deteriorating the quality of the electrode by forming a gap, such as causing a difference in the composition of the electrode mixture between the portion that is dried relatively later.

In order to solve the above problem, efforts have been made to control the evaporation rate of the solvent while drying the inside and outside of the electrode mixture layer uniformly. Drying devices used for uniform drying and control of the evaporation rate of the solvent have many disadvantages, such as being significantly expensive and requiring strict management for operation of the device.

On the other hand, a method of manufacturing an electrode by a dry method has been proposed in order to improve the problems in manufacturing an electrode using the conventional electrode mixture slurry as described above. As a method of not using an electrode solvent according to the dry method, a drying operation for removing the solvent may be omitted. However, the electrode manufactured by the conventional dry method has a problem of generating cracks on the electrode surface due to insufficient tensile strength.

Therefore, there is a high need for a technique capable of securing the tensile strength of the electrode while improving the manufacturing process of the electrode in manufacturing the electrode by the dry method.

SUMMARY

An aspect of the present disclosure is to provide a method of manufacturing a dry electrode sheet by a dry method that does not require a drying process.

An aspect of the present disclosure is to provide an apparatus for manufacturing a dry electrode sheet by a dry method capable of improving tensile strength of an electrode sheet and preventing cracks.

An aspect of the present disclosure is to provide a dry electrode sheet manufactured by the above method and having improved tensile strength and no cracking, an electrode and a secondary battery including the same.

According to an aspect of the present disclosure, a method of manufacturing a dry electrode sheet for a secondary battery includes providing a dry electrode composition comprising an electrode active material and a binder; a calendering operation of preparing an dry electrode sheet by passing the dry electrode composition through a calender roll including three or more rolls. The calendering operation includes a first electrode sheet manufacturing operation of manufacturing a first electrode sheet by injecting the dry electrode composition between two adjacent rolls spaced apart from each other by a first interval W1, and an electrode sheet manufacturing operation of manufacturing a dry electrode sheet by inserting the first electrode sheet between two adjacent rolls spaced apart from each other by a second interval W2. The first interval W1 and the second interval W2 have a compression rate of 0.10 or more and 0.65 or less, represented by the equation (1) compression rate=(W1−W2)/W1.

The compression ratio may be 0.14 to 0.54 or less.

The first interval W1 may be 100 to 500 μm, and the second interval W2 may be 60 to 450 μm.

The calender roll may include a first roll, a second roll and a third roll, the dry electrode composition may be introduced between a first roll and a second roll to prepare the first electrode sheet, and the first electrode sheet may be introduced between the second roll and the third roll.

In the calender roll, the rotational speed V1 of the first roll, the rotational speed V2 of the second roll, and the rotational speed V3 of the third roll may satisfy a relationship of V1<V2<V3.

The rotation speed ratio V1:V2:V3 of the first roll, the second roll, and the third roll may be 10:11 to 20:12 to 40.

The calender roll includes a first roll, a second roll, a third roll, and a fourth roll, and the dry electrode composition is fed between the first roll and the second roll to prepare the first electrode sheet. The electrode sheet may be manufactured by feeding the first electrode sheet between the third roll and the fourth roll.

In the calender roll, the rotational speed V1 of the first roll, the rotational speed V2 of the second roll, the rotational speed V3 of the third roll, and the rotational speed V4 of the fourth roll are V1<V2≤V3<V4 or V1>V2≤V3>The relationship of V4 (provided that V1<V4) may be satisfied.

The rotation speed ratio V1:V2:V3:V4 of the first roll, the second roll, the third roll, and the fourth roll may be 10:11 to 20:11 to 20:12 to 40.

The calender roll may have a temperature of 40° C. to 200° C.

The binder may be a fiberizable binder.

The binder may be selected from the group consisting of polytetrafluoroethylene, polyethylene oxide, polyvinylpyrrolidone, polyvinyl alcohol and cellulose derivatives.

A step of kneading the dry electrode composition provided above may be further included.

The dry electrode composition may further include at least one selected from the group consisting of a conductive material and a particulate binder.

According to an aspect of the present disclosure, an apparatus for manufacturing a dry electrode sheet for a secondary battery includes a calender roll including three or more rolls spaced apart from each other and manufacturing a dry electrode sheet by calendering a dry electrode composition supplied between the rolls. The calendar roll includes a first roll and a second roll spaced apart at a first interval w1 in which the dry electrode composition is injected to prepare a first electrode sheet, and a third roll and a fourth roll spaced apart at a second interval w2 in which the first electrode sheet is input to manufacture a dry electrode sheet, and the second roll and the third roll are the same roll or different rolls. In the first interval W1 and the second interval W2, a compression ratio expressed by Compression Ratio=(W1−W2)/W1 is 0.10 or more and 0.65 or less.

The compression ratio may be 0.14 to 0.54 or less.

The first interval W1 may be 100 to 500 μm, and the second interval W2 may be 60 to 450 μm.

In the calender roll, the rotational speed V1 of the first roll, the rotational speed V2 of the second roll, the rotational speed V3 of the third roll, and the rotational speed V4 of the fourth roll may satisfy V1<V2≤V3<V4 or V1>V2≤V3>V4 (V1<V4).

The rotation speed ratio V1:V2:V3:V4 of the first roll, the second roll, the third roll, and the fourth roll may be 10:11 to 20:11 to 20:12 to 40.

The calender roll may have a temperature of 40° C. to 200° C.

According to an aspect of the present disclosure, a dry electrode sheet for a secondary battery manufactured by the manufacturing method as described above is provided.

The dry electrode sheet may have a tensile strength of 0.5 N/mm² or more.

The dry electrode sheet may have an electrode density of 2.0 g/cc or more.

The dry electrode sheet may have a thickness of 100 to 500 μm.

According to another embodiment, the current collector; and the dry electrode sheet for secondary batteries disposed on the current collector.

The dry electrode sheet may have a tensile strength of 0.50 N/mm² or more.

The dry electrode sheet may have an electrode density of 2.0 g/cc or more.

The electrode may be a cathode or an anode.

According to an aspect of the present disclosure, a secondary battery includes an electrode assembly including a positive electrode, a separator, and a negative electrode, in which an electrolyte solution is accommodated in a battery case and sealed. At least one of the positive electrode and the negative electrode is the electrode described above.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, preferred embodiments will be described. However, the embodiments may be modified in many different forms, and the scope of the present disclosure is not limited to the embodiments described below.

The present disclosure relates to a method for manufacturing a dry electrode sheet for a secondary battery, an apparatus for manufacturing the dry electrode sheet, a dry electrode sheet manufactured by the method, and an electrode and a secondary battery including the dry electrode sheet.

As an embodiment, the method for manufacturing a dry electrode sheet for a secondary battery includes providing a dry electrode composition comprising an electrode active material and a binder, and a calendering operation of preparing a dry electrode sheet by passing the dry electrode composition through a calender roll including three or more rolls. The dry electrode composition may include an electrode active material and a binder. The binder may be evenly distributed among the electrode active materials by mixing the dry electrode composition including the powdery components not containing the solvent using a blender or the like. In this embodiment, no solvent is included, but a small amount of solvent may be included if necessary.

The method for manufacturing a dry electrode sheet for a secondary battery according to the present disclosure may be applied to both manufacturing a positive electrode sheet and a negative electrode sheet. Accordingly, the electrode active material may be a positive electrode active material or a negative electrode active material.

For example, when an electrode to be manufactured is an anode, the anode active material may be a carbon-based anode active material. The carbon-based negative electrode active material may be suitably used in the present disclosure as long as it is commonly used in the manufacture of a negative electrode of a secondary battery, and is not particularly limited, but may be artificial graphite, natural graphite, or a mixture of artificial graphite and natural graphite. Artificial graphite may further improve the dispersibility of the slurry, and may improve the lifespan and high-temperature storage characteristics.

The shape of the artificial graphite or natural graphite may be amorphous, plate-like, flake-like, spherical, fibrous, or a combination thereof. In addition, when mixing and using the artificial graphite and natural graphite, the mixing ratio may be 70:30 to 95:5 by weight.

The anode active material may be used without particular limitation as long as it has a shape capable of intercalating and deintercalating lithium ions, and generally has an aspect ratio of 20 or more in terms of improving the function of the anode active material for a lithium secondary battery.

In addition, the negative electrode active material may further include at least one of a silicon (Si)-based negative electrode active material, a tin (Sn)-based negative electrode active material, or a lithium vanadium oxide negative electrode active material together with the carbon-based negative electrode active material. When the anode active material further includes these, it may be included in the range of 1 to 50% by weight based on the total weight of the anode active material.

The Si-based negative electrode active material may be Si, a Si—C composite, SiOx (0<x<2), or a Si-Q alloy. In the Si-Q alloy, Q may be an element selected from the group consisting of alkali metals, alkaline earth metals, Group 13 elements, Group 14 elements, Group 15 elements, Group 16 elements, transition metals, rare earth elements, and combinations thereof, other than Si, and in detail, may be selected from the group consisting of, Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof.

In general, as an anode active material, a Si-based anode active material is known to have a large volume change characteristic. In general, a silicon-based negative electrode active material may be added together with a carbon-based negative electrode active material such as graphite, and in this case, carbon nanotubes may be included as a conductive material to prevent swelling due to volume expansion of the silicon-based negative electrode active material.

The Sn-based negative electrode active material may be Sn, SnO2, or Sn—R alloy. In the Sn—R alloy, R may be an element selected from the group consisting of alkali metals, alkaline earth metals, group 13 elements, group 14 elements, group 15 elements, group 16 elements, transition metals, rare earth elements, and combinations thereof, other than Sn and Si, and in detail, may be selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, In, Tl, Ge, P, As, Sb, Bi, S, Se, Te, Po, and combinations thereof.

The content of the negative electrode active material in the negative electrode mixture layer may be 94 to 98% by weight based on the total weight of the dry negative electrode composition.

Meanwhile, when an electrode to be manufactured is a positive electrode, a compound capable of reversibly intercalating and deintercalating lithium (lithiated intercalation compound) may be used as the positive electrode active material. In detail, at least one of a composite oxide of lithium and a metal selected from cobalt, manganese, nickel, and combinations thereof may be used.

More specific examples include a lithium transition metal compound (oxide) having a layered structure represented by the general formula $LiMO_2$, where M includes at least one of transition metal elements such as Ni, Co, and Mn, and may further include other metal elements or non-metal elements. As the complex oxide, there may be, for example, a monolithic lithium transition metal composite oxide containing one type of the transition metal element, a so-called binary lithium transition metal composite oxide containing two types of transition metal elements, and a ternary lithium transition metal composite oxide containing Ni, Co and Mn as transition metal elements as constituent elements. In detail, examples of the composite oxide may include $Li_xMn_{1-y}M_yA_2$, $Li_xMn_{1-y}M_yO_{2-z}X_z$, $Li_xMn_2O_{4-z}X_z$, $Li_xMn_{2-y}M_yM'_zA_4$, $Li_xCo_{1-y}M_yA_2$, $Li_xCo_{1-y}M_yO_{2-z}X_z$, $Li_xNi_{1-y}M_yA_2$, $Li_xNi_{1-y}M_yO_{2-z}X_z$, $Li_xNi_{1-y}Co_yO_{2-z}X_z$, $Li_xNi_{1-y-z}Co_yM_zA\alpha$, $Li_xNi_{1-y-z}Co_yM_zO_{2-\alpha}X_\alpha$, or $Li_xNi_{1-y-z}Mn_yM_zA\alpha$, $Li_xNi_{1-y-z}Mn_yM_zO_{2-\alpha}X$ (In these formulas, $0.9 \leq x \leq 1.1$, $0 \leq y \leq 0.5$, $0 \leq z \leq 0.5$, and $0 \leq \alpha \leq 2$, M and M' are the same or different and are selected from the group consisting of Mg, Al, Co, K, Na, Ca, Si, Ti, Sn, V, Ge, Ga, B, As, Zr, Mn, Cr, Fe, Sr, V and rare earth elements, A is selected from the group consisting of O, F, S and P, and X is selected from the group consisting of F, S and P), and for example, may be a ternary lithium transition metal composite oxide such as $Li(Ni_{1/3}Co_{1/3}Mn_{1/3})O_2$.

In addition, examples of a lithium transition metal compound (oxide) represented by the general formula Li2MO3 may include, for example, Li2MnO3, Li2PtO3, or the like, where M includes at least one of transition metal elements such as Mn, Fe, and Co, and may further include other metal elements or non-metal elements.

In addition, the cathode active material may be a solid solution of LiMO2 and Li2MO3, for example, a solid solution represented by 0.5LiNiMnCoO2-0.5Li2MnO3.

Furthermore, one having a coating layer on the surface of the positive active material may be used, or a mixture of the compound and a compound having a coating layer may be used. The coating layer may include at least one coating element compound selected from the group consisting of oxides, hydroxides, oxyhydroxides, oxycarbonates, and hydroxycarbonates of coating elements. Compounds constituting these coating layers may be amorphous or crystalline. As the coating element included in the coating layer, Mg, Al, Co, K, Na, Ca, Si, Ti, V, Sn, Ge, Ga, B, As, Zr, or mixtures thereof may be used.

In the positive electrode, the positive electrode active material may be 90 to 98% by weight based on the total amount of the dry positive electrode composition.

The dry electrode composition includes a binder. As the binder, one capable of being fibrous may be used, examples of the fiberizable binder include polytetrafluoroethylene, polyethylene oxide, polyvinylpyrrolidone, polyvinyl alcohol, and cellulose derivatives. The binder as described above is particles in which fine fibers are agglomerated to form a bundle, and by applying a predetermined heat and pressure, the fibers constituting the bundle are released and formed into fine fibers.

The binder may be included in an amount of 1 to 5% by weight based on the dry electrode composition. For example, the binder may be included in an amount of 1% by weight or more, 1.5% by weight or more, or 2% by weight or more, and may be included in an amount of 5% by weight or less, 4.5% by weight or less, or 4% by weight or less. If the content of the binder is less than 1% by weight, it may be difficult to maintain the sheet shape because the binder content is low and the binding force between the solids such as electrode active materials included in the electrode mixture layer is not sufficient. If it exceeds 5% by weight, there is a problem of excessive increase in electrode resistance.

Along with the fiberizable binder, a particulate binder may be further included. As the particulate binder, those commonly used in electrode manufacturing may be used, but are not particularly limited. The particulate binder may be at least one selected from the group consisting of polyvinylidene fluoride, polyvinylidene fluoride-hexafluoropropylene, polyvinylidene fluoride-trichloroethylene, polymethyl methacrylate, polyacrylonitrile, and polyvinyl acetate, ethylene-vinyl acetate copolymer, cyanoethyl pullulan, and pullulan.

The conductive material may be used without limitation as long as it is commonly used in secondary batteries, and for example, carbon-based materials such as graphite such as natural graphite or artificial graphite, carbon black, acetylene black, ketjen black, carbon fiber, and carbon nanotubes. However, it may be at least one selected from the group consisting of metal-based materials such as metal powders or metal fibers such as copper, nickel, aluminum, and silver, and conductive polymers such as conductive oxides or polyphenylene derivatives. The conductive agent is not limited thereto, but may be included in an amount of, for example, 0.5 to 3% by weight based on the total electrode composition.

A dry electrode composition manufacturing method according to an embodiment may include mixing a dry electrode composition including an electrode active material and a binder, as described above. As a result, the electrode active material, the binder, and the conductive material added as needed may be evenly distributed.

Figure 1:
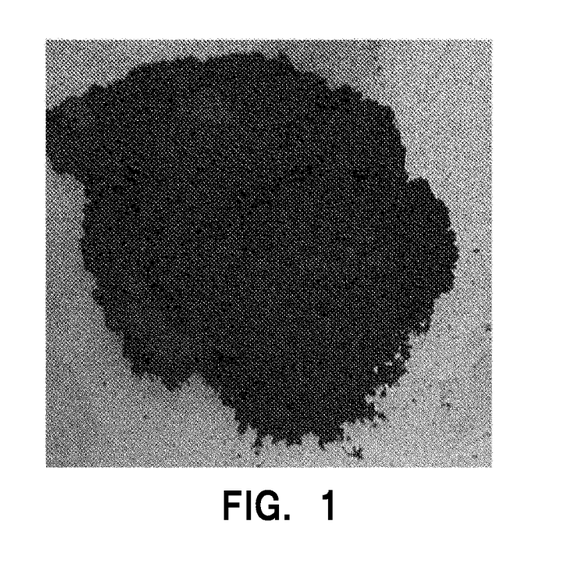
FIG. 1 is an image illustrating a dry electrode composition according to an embodiment.

The mixing is not particularly limited, and may be applied in this embodiment as long as it is mixing solid powder. For example, a blender, mixer, etc. may be used, and any powder included in the dry electrode composition may be mixed. The mixing conditions are not particularly limited. As an example of the dry electrode composition prepared by the above method, an image of a dry cathode composition in which a cathode active material, a binder, and a conductive material are mixed in a blender is illustrated in FIG. 1.

In an embodiment, kneading the dry electrode composition may be included. The kneading may be performed by applying heat and pressure to the dry electrode composition. By kneading by applying heat and pressure, the fiberizable binder included in the dry electrode composition becomes soft, and the fiber bundles are released to form fine fibers, which are dispersed on the surface of particles such as electrode active materials to bind the particles, and when forming an electrode sheet, a sheet shape may be maintained.

The kneading may be suitably used in the present disclosure without particular limitation as long as it may apply heat and pressure to the dry electrode composition. For example, a screw-type kneader may be used.

A dry electrode sheet may be manufactured using the dry electrode composition as described above. As described above, the manufacturing method of the dry electrode sheet includes a calendering operation using a calender roll.

In the calendering operation, a first electrode sheet is prepared by injecting the dry electrode composition between two adjacent rolls spaced apart from each other at a predetermined interval, and the first electrode sheet is fed between two adjacent rolls spaced apart from each other at a predetermined interval, and manufacturing a dry electrode sheet by inputting.

For example, by calendering a dry electrode composition by injecting a dry electrode composition between two rolls spaced apart at a predetermined interval to prepare a first electrode sheet, and by injecting the first electrode sheet between two rolls spaced apart at a predetermined interval and calendering, a dry electrode sheet may be manufactured.

In the calendering process as described above, the fiberizable binder included in the dry electrode composition may be fiberized by pressure and predetermined heat provided by rotation of two rolls to be manufactured into a sheet shape. Therefore, in manufacturing the dry electrode sheet, as the binder included in the dry electrode composition becomes fibrous, tensile strength may be provided to the dry electrode sheet to maintain the sheet shape.

Figure 2:
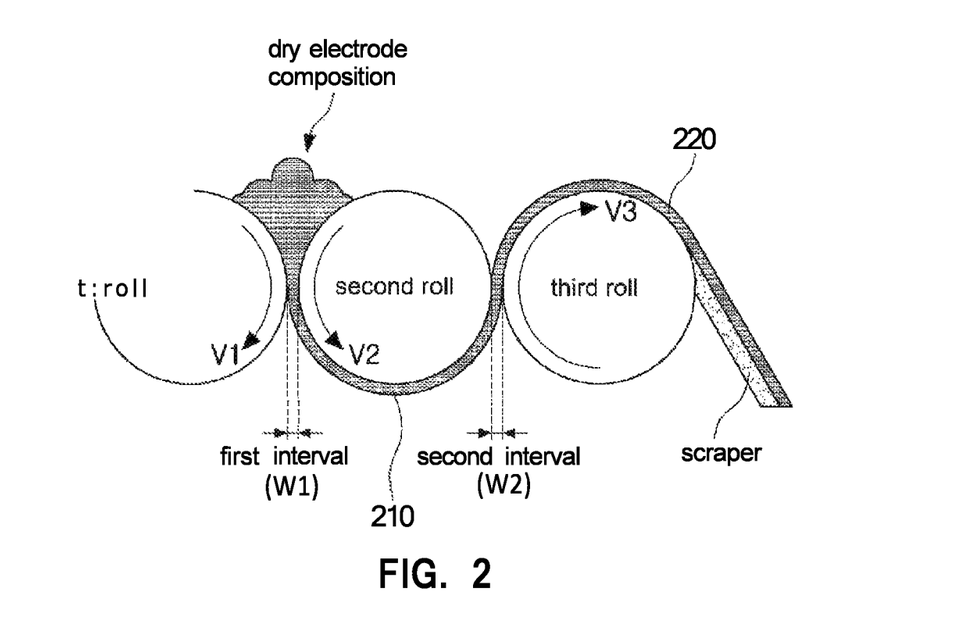
FIG. 2 is a diagram illustrating an apparatus for manufacturing a dry electrode sheet according to an embodiment.

Thus, as an embodiment, a dry electrode sheet may be manufactured using the dry electrode manufacturing apparatus as illustrated in FIG. 2. In detail, as illustrated in FIG. 2, the dry electrode sheet may be manufactured by calendering two or more times using a calender roll including three rolls.

For example, in the calendering operation, a first electrode sheet 210 is prepared by injecting the dry electrode composition between two adjacent rolls spaced apart by a first interval W1, for example, between the first roll and the second roll in FIG. 2, and a second electrode sheet 220, as a final dry electrode sheet may be manufactured by inserting the first electrode sheet between two adjacent rolls spaced at a second interval W2, for example, between the second roll and the third roll in FIG. 2.

Figure 3:
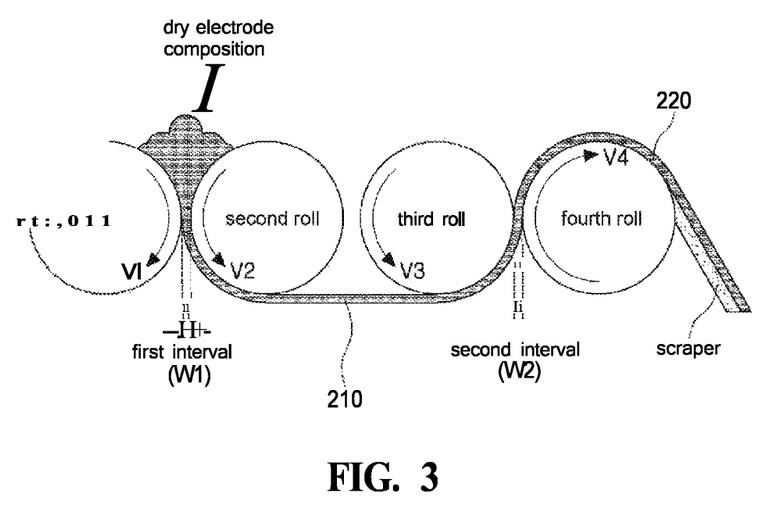
FIG. 3 is a view illustrating an apparatus for manufacturing a dry electrode sheet according to another embodiment.

As another embodiment, a dry electrode sheet may be manufactured using a dry electrode sheet manufacturing apparatus as illustrated in FIG. 3. In detail, as illustrated in FIG. 3, the dry electrode sheet may be manufactured by calendering two or more times using a calender roll including four rolls.

For example, in the calendering operation, the first electrode sheet 210 is manufactured by injecting the dry electrode composition between two adjacent rolls spaced at a first interval W1, for example, between the first roll and the second roll in FIG. 3 and inserting the first electrode sheet 210 between two adjacent rolls spaced at a second interval W2, for example, between the third roll and the fourth roll in FIG. 3 to manufacture a second electrode sheet 220.

At this time, in order to improve the fiberization of the binder, the interval between the two rolls provided for calendering in each embodiment, for example, the interval between the first roll and the second roll in FIGS. 2 and 3 (first interval, W1) and between the second and third rolls in FIG. 2 and between the third and fourth rolls in FIG. 3 (second interval, W2) may be adjusted.

In detail, the second interval W2 may have a smaller value than the first interval W1 (W1>W2). As the second gap W2 has a smaller value, the first electrode sheet 210 obtained by passing through the first gap is subjected to a higher pressure in the second gap, and fiberization of the binder included in the first electrode sheet 210 may be further improved.

In more detail, the first electrode sheet 210 passing between the two rolls having the first interval W1 is compressed by passing between the two rolls having the second interval W2. The compression ratio applied to the first electrode sheet 210 due to the difference in the interval W2 may be calculated by the following equation (1).

$$\text{Compression rate} = [(\text{first interval}) - (\text{second interval})]/(\text{first interval}) = (W1 - W2)/W1 \qquad (1)$$

At this time, the calender roll may be configured such that the compression rate calculated by Equation (1) has a value of 0.10 or more and 0.65 or less. In more detail, the compression ratio may have a value of 0.14 or more and 0.54 or less.

When the compression ratio is less than 0.10, the inner density of the electrode is lowered, and the pressure is not sufficiently provided to the first electrode sheet 210, so that the fiberization of the binder does not sufficiently occur, so that the binding force of the particles such as the electrode active material by the binder is lowered, resulting in a decrease in tensile strength. An electrode for heating may be manufactured, and if the compression ratio exceeds 0.65, excessive pressure may be applied to the first electrode sheet 210, causing cracks in the dry electrode sheet or tearing of the dry electrode sheet.

For example, the first interval may be 100 to 500 μm, and the second interval may be 60 to 450 μm.

If the first interval is less than 100 μm, excessive pressure is applied, making it difficult to form an dry electrode sheet, and electrode rolling may occur, such as becoming hard and brittle, and if it exceeds 500 μm, the pressure applied to the dry electrode sheet is insufficient and Fiberization does not progress, and the binding force of particles such as electrode active material is lowered, so that a dry electrode sheet may not be formed.

In addition, as an embodiment, calendering may be performed by adjusting the rotational speed of each of the rolls. For example, when calendering is performed using three rolls, the rotational speed of the first and second rolls and the rotational speed of the second and third rolls may be different. In addition, for example, when calendering is performed using four rolls, the rotational speed of the first and second rolls and the rotational speed of the third and fourth rolls may be different.

In this manner, when calendering is performed by varying the rotation speed of each roll, shear pressure may be applied to the dry electrode composition and the dry electrode sheet. Such shear pressure may promote fiberization of the binder included in the electrode composition and the dry electrode sheet, thereby improving the binding force of the binder to particles such as electrode active material, thereby improving the tensile strength of the dry electrode sheet.

For example, between rolls adjacent to each other where calendering is performed, the rotational speed of one roll may be greater than the rotational speed (rpm) of the other roll.

In detail, when the calendar roll includes three rolls and performs calendering twice, when the rotational speeds of the first roll, second roll, and third roll are V1, V2, and V3, respectively, the following equation (2) may have a relationship.

$$V1 < V2 < V3 \quad (2)$$

In more detail, the rotation speed ratio V1:V2:V3 between the first roll, the second roll, and the third roll may be 10:11 to 20:12 to 40, for example, 10:11 to 20:12 to 30, 10:11 to 15:12 to 30, 10:11 to 15:12 to 25, 10:11 to 15:12 to 20 or 10:12:14, and in addition, may have various rotational speed ratios.

In addition, when calendering is performed twice by including 4 rolls, the rotational speeds of the first roll, the second roll, the third roll, and the fourth roll are V1, V2, V3, and V4, respectively, the relationship of the following equation (3) or (4) may be provided.

$$V1 < V2 \leq V3 < V4 \quad (3)$$

$$V1 > V2 \leq V3 > V4 \quad (4)$$

However, in the above formula (4), V1<V4.

In more detail, the rotational speed ratio V1:V2:V3:V4 between the first roll, the second roll, the third roll, and the fourth roll may be a ratio of 10:11 to 20:11 to 20:12 to 40, for example, 10:11 to 20:12 to 20:12 to 30, 10:11 to 15:11 to 15:12 to 30, 10:11 to 15:11 to 15:12 to 25, 10:11 to 15:11 to 15:12 to 20 or 10:12:12:14, and may have various rotation speed ratios.

If the rotation speed ratio is less than 10:11:12, rolling may occur between the active materials and the dry electrode sheet may be broken, and if it exceeds 10:20:40, excessive shear pressure is applied to the electrode sheet, causing wrinkles on the surface of the dry electrode sheet or causing breakage of the dry electrode sheet.

In performing the calendering, predetermined heat may be applied. For example, calender rolls performing calendering may be heated. When the calender roll is heated in this manner, heat may be provided to the dry electrode composition or the electrode sheet, and as a result, the binder may be softened and fiberization of the binder may be promoted.

In detail, the calender roll may have a temperature of 40° C. or higher. If the temperature of the calender roll is less than 40° C., the binder may not be fibrous enough to provide sufficient binding force of the electrode active material, etc., and thus the tensile strength of the electrode sheet may be insufficient. Meanwhile, the temperature of the calender roll is not particularly limited as long as the thermal decomposition of the binder does not occur, but may be, for example, 200° C. or less.

In the present disclosure, manufacturing of the dry electrode sheet by calendering twice has been described as an example, but the present disclosure is not limited thereto, and those skilled in the art will understand that more calendering operations may be performed.

For example, the calendering operation may be performed three or more times. In the case of performing the calendering operation three or more times, the interval between adjacent rolls performing calendering with each other, the first interval between the two rolls from which the first electrode sheet 210 is obtained, and the second electrode sheet The compression ratio according to the relationship between the second intervals in the two rolls from which 220 is obtained and the rotational speed ratio between the rolls may be satisfied in any part of the process of obtaining the final dry electrode sheet after calendering by injecting the dry electrode composition, may or may not be satisfied in a calendering process in which these relationships are continuous with each other. For example, the calendering operation for obtaining the second electrode sheet and the calendering operation for obtaining the third electrode sheet may be satisfied, and the calendering operation for obtaining the first electrode sheet and the calendering operation for obtaining the third electrode sheet may be satisfied.

As illustrated in FIGS. 2 and 3, the roll from which the final electrode sheet is obtained may include a scraper for separating the dry electrode sheet from the roll surface. The dry electrode sheet separated from the roll surface by the scraper may be used for electrode manufacturing, and may be rolled up if necessary.

According to another aspect of the present disclosure, in calendering using the dry electrode composition as described above, a dry electrode sheet with improved tensile strength may be obtained by adjusting the interval between the rolls on which calendering is performed and, if necessary, adjusting the compression ratio or rotational speed.

In an embodiment, the dry electrode sheet may include an electrode active material and a fibrous binder, and may have a tensile strength of 0.50 N/mm$^2$ or more. For example, the dry electrode sheet may have a tensile strength of 0.7 N/mm² or more, 0.8 N/mm² or more, or 0.9 N/mm² or more. When the tensile strength of the dry electrode sheet is less than 0.50 N/mm², it may be difficult to maintain the sheet shape, such as cracks occurring in the dry electrode sheet or breakage of the dry electrode sheet.

The higher the tensile strength of the dry electrode sheet, the higher the speed of the electrode manufacturing process using the dry electrode sheet, thereby contributing to process stability by reducing the probability of fracture. Therefore, the upper limit of the tensile strength is not particularly limited, and may be, for example, 1.5 N/mm², specifically 1.2 N/mm².

The dry electrode sheet manufactured according to this embodiment is not particularly limited, but may have an electrode density of 2.0 g/cc or more. For example, the electrode density of the dry electrode sheet may be 2.1 g/cc or more, 2.2 g/cc or more, 2.3 g/cc or more, 2.4 g/cc or more, 2.5 g/cc or more, or 2.6 g/cc or more.

Although not particularly limited, the thickness of the dry electrode sheet may be 100 to 500 μm. If the thickness of the dry electrode sheet is less than 100 μm, fracture may occur due to insufficient tensile strength of the dry electrode sheet, and if the thickness exceeds 500 μm, components constituting the electrode may be mixed unevenly in the thickness direction of the dry electrode sheet. For example, the dry electrode sheet may be 150 μm or more, 200 μm or more, 250 μm or more, and may be 450 μm or less or 400 μm or less.

In addition, according to another aspect of the present disclosure, an electrode including the dry electrode sheet described above is provided. In detail, the electrode may be manufactured by placing a dry electrode sheet on at least one surface of an electrode current collector, heating and pressurizing it.

The electrode current collector is not particularly limited as long as it has high conductivity without causing chemical change in the battery. When the electrode is an anode, the electrode current collector is not particularly limited, but a thin plate made of aluminum, stainless steel, or nickel may be used, and in more detail, a thin plate made of aluminum may be used. In addition, when the electrode is a negative electrode, the current collector is, for example, copper, stainless steel, aluminum, nickel, titanium, calcined carbon, copper or stainless steel surface treated with carbon, nickel, titanium, silver, etc. that, an aluminum-cadmium alloy, etc. may be used.

The electrode current collector may be in various forms such as a film, sheet, foil, porous material, foam, nonwoven fabric, mesh or mesh shape. In addition, fine irregularities may be formed on the surface to enhance bonding strength with the dry electrode sheet, and the surface may be coated with an oxidation-resistant metal or alloy film to prevent oxidation.

Furthermore, a secondary battery may be manufactured by using the electrode as an anode, a cathode, or a cathode and a cathode. For example, a secondary battery may be manufactured by manufacturing an electrode assembly by sequentially stacking a positive electrode and a negative electrode with a separator as a boundary, accommodating the electrode assembly together with an electrolyte in a battery case and sealing it. At this time, the battery case is not particularly limited, but may be a pouch-type case, and may be a prismatic or cylindrical metal case.

A secondary battery module may be constructed using the secondary battery according to the present disclosure as a unit cell, and one or more of the modules may be packaged in a pack case to form a secondary battery pack.

The above-described secondary battery module and secondary battery pack including the same may be applied to various devices. In detail, it may be applied to various devices that may use a secondary battery module and a secondary battery pack including the same, and is not particularly limited, but may be applied to vehicles such as electric bicycles, electric vehicles, and hybrid vehicles, for example.

EXAMPLE

Hereinafter, the present disclosure will be described in more detail through specific examples. The following examples are merely examples to aid understanding of the present disclosure, and the scope of the present disclosure is not limited thereto.

Example 1

A dry positive electrode composition by mixing 96.5% by weight of a cathode active material containing nickel, cobalt, and manganese in a weight ratio of 8:1:1, 0.5% by weight of a carbon nanotube conductive material, and 3% by weight of a polytetrafluoroethylene (PTFE) binder was manufactured. The prepared dry positive electrode composition is illustrated in FIG. 1.

As illustrated in FIG. 2, the dry positive electrode composition is introduced between the first roll and the second roll of the calender roll in which three rolls of the first roll, the second roll, and the third roll are continuously positioned to form the first positive electrode composition. After preparing the sheet 210, the first positive electrode sheet 210 was continuously fed between the second roll and the third roll to prepare the positive electrode sheet 220.

At this time, the calender roll had a first interval (W1) between the first and second rolls of 300 μm, a second interval (W2) between the second and third rolls of 260 μm, and the rotational speed of the first roll (V1), the rotational speed ratio V1:V2:V3 between the rotational speed of the second roll (V2) and the rotational speed of the third roll (V3) is set to 10:12:14, and the calender roll is heated to 120° C., and calendering was performed.

The compression ratio was calculated by Equation (1) below from the first gap (W1) and the second gap (W2) of the calender roll, and the results are illustrated in Table 1.

$$\text{Compression Ratio} = (W1-W2)/W1 \tag{1}$$

In addition, the thickness and tensile strength of the positive electrode sheet thus prepared were measured, and the results are illustrated in Table 1.

Figure 4:
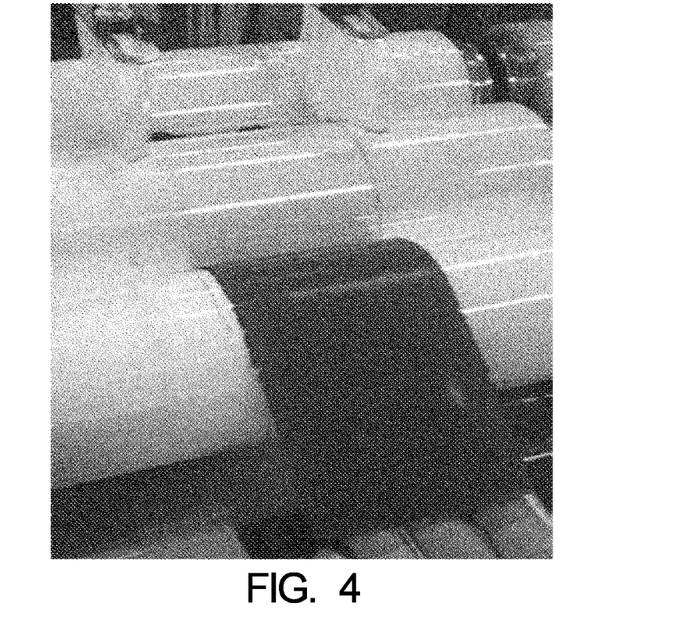
FIG. 4 is an image of a dry electrode sheet for a secondary battery manufactured in Example 1 of the present disclosure.

In addition, the positive electrode sheet manufactured through the second roll and the third roll was imaged and illustrated in FIG. 4.

Figure 5:
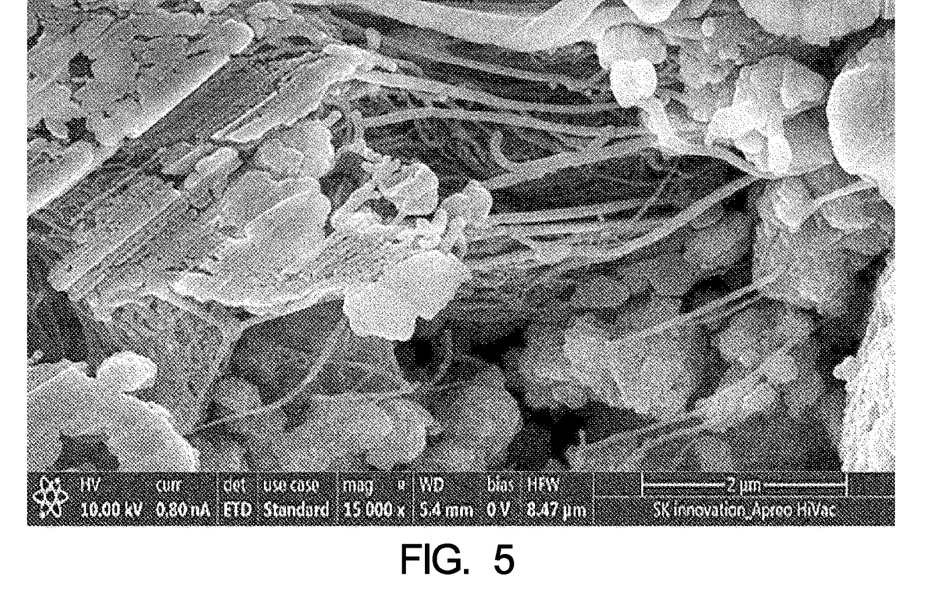
FIG. 5 is an image captured with an electron microscope of the positive electrode sheet prepared in Example 1.

The presence or absence of cracks on the surface of the positive electrode sheet was observed with the naked eye, and the respective results are illustrated in Table 1, and the resulting positive electrode sheet was imaged with an electron microscope and illustrated in FIG. 5.

Tensile strength: A positive electrode sheet having a size of 10 mm in width×100 mm in length was manufactured and measured by pulling both ends of the specimen at a speed of 5 cm/min with Universal Testing Machine (UTM) equipment.

Example 2

A positive electrode sheet was manufactured in the same manner as in Example 1, except that the first gap (W1)

between the first and second rolls is 300 µm, the second gap (W2) between the second and third rolls is 220 µm, and a calendar roll in which having a rotational speed ratio V1:V2:V2 of the first, second, and third rolls is 10:12:14 was used.

In the same manner as in Example 1, the compression rate was calculated using Equation (1), and the results are illustrated in Table 1.

Furthermore, for the prepared positive electrode sheet, the same as in Example 1, the thickness, tensile strength, and presence or absence of cracks on the surface of the positive electrode sheet are illustrated in Table 1.

Comparative Example 1

A positive electrode sheet was manufactured in the same manner as in Example 1, except that the first gap (W1) between the first and second rolls is 300 µm, the second gap (W2) between the second and third rolls is 280 µm, and a calendar roll in which a rotational speed ratio V1:V2:V3 of the first, second, and third rolls is 10:12:14 was used.

In the same manner as in Example 1, the compression rate was calculated using Equation (1), and the results are illustrated in Table 1.

Furthermore, for the prepared positive electrode sheet, the same as in Example 1, the thickness, tensile strength, and presence or absence of cracks on the surface of the positive electrode sheet are illustrated in Table 1.

Comparative Example 2

A positive electrode sheet was manufactured in the same manner as in Example 1, except that the first gap (W1) between the first and second rolls is 300 µm, the second gap (W2) between the second and third rolls is 140 µm, and a calendar roll in which a rotational speed ratio V1:V2:V3 of the first, second, and third rolls is 10:12:14 was used.

In the same manner as in Example 1, the compression rate was calculated using Equation (1), and the results are illustrated in Table 1.

Furthermore, for the prepared positive electrode sheet, the same as in Example 1, the thickness, tensile strength, and presence or absence of cracks on the surface of the positive electrode sheet are illustrated in Table 1.

TABLE 1

| | First Interval W1 (µm) | Second Interval W2 (µm) | Positive electrode sheet Thickness (µm) | Compressibility (%) | Tensile Strength (N/mm$^2$) | Cracking Occurrence |
|---|---|---|---|---|---|---|
| Example 1 | 300 | 260 | 275 | 0.14 | 0.71 | Nothing |
| Example 2 | 300 | 220 | 255 | 0.27 | 0.84 | Nothing |
| Comparative Example 1 | 300 | 280 | 298 | 0.07 | 0.31 | Occurred |
| Comparative Example 2 | 300 | 140 | 189 | 0.54 | Unmeasurable | Occurred |

As can be seen in Table 1, the dry positive electrode sheets prepared according to Examples 1 and 2 were produced by calendering using a calender roll that satisfies the range of compression ratio defined in an embodiment, the tensile strength was excellent, and no cracks were found on the surface of the positive electrode sheet. In addition, as can be seen from FIG. 5, it can be seen that the fiberizable binder is fibrous by the shear pressure between the rolls and exists in the form of fibers in the dry electrode sheet, and this fibrous binder binds the positive electrode active materials to maintain the sheet shape.

However, the positive electrode sheet of Comparative Example 1 prepared under conditions of low compression ratio exhibited a significantly lower tensile strength value than the positive electrode sheets of Examples 1 and 2, and cracks were formed on the surface of the positive electrode sheet, which significantly deteriorated the quality of the positive electrode sheet. In particular, it is determined that Comparative Example 1 has a low compression ratio, so that sufficient pressure is not provided to the first positive electrode sheet during the calendering process, so that the effect of the binder becoming fibrous is not sufficiently obtained.

On the other hand, the positive electrode sheet prepared in Comparative Example 2 was manufactured by calendering with a high compression ratio, and the positive electrode sheet was broken due to excessively high pressure being applied to the first positive electrode sheet, so that the shape of the sheet was not obtained. Because of this, the tensile strength of the positive electrode sheet could not be measured.

As set forth above, according to the method of manufacturing a dry electrode sheet for a secondary battery of the present disclosure, since a drying process of a solvent is not included, it has improved process efficiency.

In addition, according to the present disclosure, the tensile strength of the electrode sheet may be improved and crack generation may be prevented.

In addition, since the present disclosure does not include an electrode coating process and a drying process, the process may be simplified and the equipment investment cost may be reduced.

While example embodiments have been illustrated and described above, it will be apparent to those skilled in the art that modifications and variations could be made without departing from the scope of the present disclosure as defined by the appended claims.

What is claimed is:

1. A method of manufacturing a dry electrode sheet for a secondary battery, the method comprising:
    providing a dry electrode composition comprising an electrode active material and a binder; and
    feeding the dry electrode composition directly to a calendering operation
    wherein the calendering operation includes:
    injecting the dry electrode composition between two adjacent rolls spaced apart from each other by a first interval W1 to provide a first electrode sheet,
    inserting the first electrode sheet between two adjacent rolls spaced apart from each other by a second interval W2 to provide the dry electrode sheet, and
    wherein the first interval W1 and the second interval W2 have a compression ratio expressed by the following equation (1) of 0.10 or more and 0.27 or less, Compression Ratio=(W1−W2)/W1　　(equation (1)), wherein the two adjacent rolls in the injecting step includes a first roll and a second roll, and the two adjacent rolls in the inserting step includes the second roll and a third roll, the dry electrode composition is introduced between the first roll and the second roll to prepare the first electrode sheet, and the first electrode sheet is introduced between the second roll and the third roll to manufacture the dry electrode sheet, wherein a rotational speed V1 of the first roll, a rotational speed V2 of the second roll, and a rotational speed V3 of the third roll satisfy the following formula (2)

$$V1<V2<V3 \quad (2),$$

wherein a rotation speed ratio of the first roll, the second roll and the third roll V1:V2:V3 is 10:11 to 20:12 to 40.

2. The method of claim 1, wherein the first interval W1 is 100 to 500 µm, and the second interval W2 is 60 to 450 µm.

3. The method of claim 1, wherein the two adjacent rolls in the injecting step includes the first roll and the second roll, and the two adjacent rolls in the inserting step includes the third roll and a fourth roll, the dry electrode composition is introduced between the first roll and the second roll to prepare the first electrode sheet, and the first electrode sheet is introduced between the third roll and the fourth roll to manufacture the dry electrode sheet.

4. The method of claim 3, wherein the rotational speed V1 of the first roll, the rotational speed V2 of the second roll, the rotational speed V3 of the third roll, and a rotational speed V4 of the fourth roll satisfy the relationship of the following formula (3), $$V1<V2<V3<V4 \quad (3).$$

5. The method of claim 1, wherein the injecting and inserting steps occurs at 40° C. to 200° C.

6. The method of claim 1, wherein the binder is a fiberizable binder.

7. The method of claim 1, wherein the binder is at least one selected from the group consisting of polytetrafluoroethylene, polyethylene oxide, polyacrylonitrile, polyvinylidene fluoride, cellulose derivative and propionate.

8. The method of claim 1, further comprising kneading the dry electrode composition.

9. The method of claim 1, wherein the dry electrode sheet has a tensile strength of 0.50 N/mm2 or more.

10. A method of manufacturing a dry electrode sheet for a secondary battery, the method comprising:

providing a dry electrode composition comprising an electrode active material and a binder; and feeding the dry electrode composition directly to a calendering operation wherein the calendering operation includes:

injecting the dry electrode composition between two adjacent rolls spaced apart from each other by a first interval W1 to provide a first electrode sheet, inserting the first electrode sheet between two adjacent rolls spaced apart from each other by a second interval W2 to provide the dry electrode sheet, and wherein the first interval W1 and the second interval W2 have a compression ratio expressed by the following equation (1) of 0.10 or more and 0.27 or less, $$\text{Compression Ratio}=(W1-W2)/W1 \quad (\text{equation (1)}),$$

wherein the two adjacent rolls in the injecting step includes a first roll and a second roll, and the two adjacent rolls in the inserting step includes the second roll, a third roll and a fourth roll, the dry electrode composition is introduced between the first roll and the second roll to prepare the first electrode sheet, and the first electrode sheet is introduced between the third roll and the fourth roll to manufacture the dry electrode sheet, wherein a rotational speed V1 of the first roll, a rotational speed V2 of the second roll, a rotational speed V3 of the third roll, and a rotational speed V4 of the fourth roll satisfy the following relationship, $$V1>V2\leq V3>V4 \quad (4)$$

where in formula (4), V1<V4 wherein a rotation speed ratio V1:V2:V3:V4 of the first roll, the second roll, the third roll, and the fourth roll is 10:11 to 20:11 to 20:12 to 40.

* * * * *